April 28, 1970   J. M. DENKER   3,508,465
FLUID MOTOR
Filed March 11, 1969

United States Patent Office 3,508,465
Patented Apr. 28, 1970

3,508,465
FLUID MOTOR
James M. Denker, Scituate, Mass., assignor to Nutron Corporation, Hingham, Mass., a corporation of Massachusetts
Filed Mar. 11, 1969, Ser. No. 806,059
Int. Cl. F01b *3/04, 15/00*
U.S. Cl. 91—480          16 Claims

ABSTRACT OF THE DISCLOSURE

A fluid motor comprising a rotor having a plurality of cylinders, at least one ball piston within each cylinder, and a cam having a surface engaging a piston of each cylinder. In one aspect, the cam surface is a trapezoidal acceleration cam surface. In another aspect, the cylinders extend axially of the rotor, the rotor includes a fluid passage extending from each cylinder to a porting surface that is perpendicular to the rotor's axis, and the motor includes a port plate that engages the porting surface of the rotor.

---

This invention relates to rotary fluid motors.

It is a principal object of one aspect of the present invention to provide a rotary fluid motor whose rotation is free of either jerk or dead points. It is a principal object of another aspect to provide a balanced rotary fluid motor having an extremely high power:weight ratio and which eliminates the problem of binding between relatively rotatable parts. Other objects include providing a variable displacement motor which is constructed of a relatively small number of easily and inexpensively machined parts and in which the rotor is well balanced between large, symmetrical frace-ports.

The invention features in one aspect of fluid motor comprising a plurality of cylinders, a ball piston within each of the cylinders, and a cam having a trapezoidal acceleration cam surface engaging the ball pistons. In a second aspect, the invention features a fluid motor comprising a rotor including a plurality of axially-extending cylinders and a fluid passage extending from each cylinder to a porting surface that is perpendicular to the rotor's axis, a pair of ball-pistons within each cylinder, and a port plate having a porting surface engaging the porting surface of the rotor. Preferred embodiments feature apparatus for rotating cams engaging the pistons relative to each other to vary the motor's effective displacement, axial cylinders arranged in concentric rings with the cylinders in one ring radially-aligned with the cylinders in other rings and fluid passages connecting radially-aligned cylinders, and identical port plates on opposite axial sides of the rotor.

Other objects, features and advantages will become apparent from the following detailed description of a preferred embodiment of the invention, taken together with the attached drawings, in which.

Figure 2:
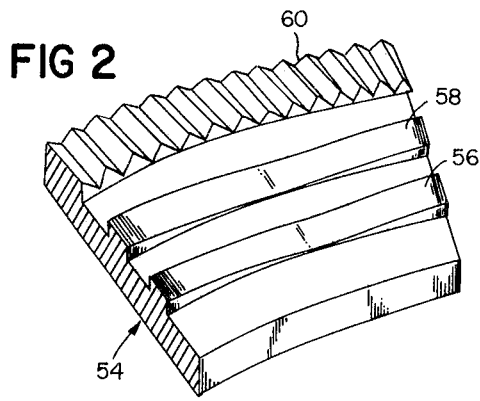
FIG. 2 is a perspective view, partially in section, of a portion of a cam of the motor of FIG. 1; and, FIG. 3 is a diagrammatic view illustrating the variable displacement of the motor of FIG. 1.

Referring more particularly to the drawings there is illustrated a motor comprising an output shaft 10 extending coaxially through a multipart housing (overall diameter 18"; overall thickness 9") including a housing center section 12 in the form of a circular ring of rectangular radial cross-section, a pair of identical port plates 14, 15 (one port plate being mounted on each axially-facing side of center section 12), a pair of identical manifolds 16, 17 (one manifold being mounted in axial-face-to-axial-face engagement with each of port plates 14, 15), and a pair of housing seal plates 18 (one housing seal plate being mounted at each axial end of the housing).

Shaft 10 is mounted for rotation relative to the housing by a pair of ball bearings 20 whose inner races engage the shaft periphery and whose outer races engage manifolds 16, 17. A pair of rubber lip seals 22, one lip seal being mounted coaxially within each of housing seal plates 18, provide the required oil tight seal between the housing and shaft 10. The various interfaces between the plates forming the housing, that is, the interfaces between housing center section 12 and port plates 14, 15 and the interfaces between port plates 14, 15 and manifolds 16, 17 are sealed with a plurality of O-rings designated 26 and 28, respectively.

Each of manifolds 16, 17 includes an annular groove 30 in the end surface thereof adjacent one of port plates 14, 15 and a drilled conduit 32, 33, respectively, communicating at its inner end with groove 30 and extending radially outward therefrom to the periphery of the manifold. The outer portion 34 of each conduit 32, 33 is tapped to receive a fluid coupling.

A total of 10 kidney-shaped ports 36, 37 extend axially through each of port plates 14, 15, respectively, and communicate at their outer ends with one of annular grooves 30. The ports in each plate are arranged in a circle and are spaced at regular intervals therearound, each port subtending an arc of approximately 18° with an 18° solid port plate portion between adjacent ports.

A rotor 38, having a thickness of approximately 1" and an overall diameter of approximately 14⅜", is mounted within the annular cavity defined by housing center section 12 and port plates 14 and 15 and connected to shaft 10 by a spline 40. A total of 126 cylindrical bores 42 (arranged in two concentric rings each including 63 bores) and 63 cylindrical ports 44 (arranged in a ring within the rings of bores 42) extend axially through rotor 38. The bores and ports of each ring are evenly spaced about the circumference of the ring with one port 44 and one bore 42 from each of the two rings of bores in radial alignment. A drilled conduit 48 extends radially inwardly from the outer periphery of rotor 38 through a pair of aligned bores 42 to the port 44 aligned therewith. The portion of the conduit radially outwardly of the outer of bores 42 is closed by a plug 50.

Two steel balls 52 (each of ½" diameter) are fitted within each of bores 42 for movement within the bore.

An annular wave cam 54, 55 including a pair of circular, radially-spaced, undulating ball-engaging surfaces 56, 58 is mounted in an inwardly-facing annular recess of each of port plates 14, 15, respectively, with ball-engaging surfaces 56, 58 engaging, respectively, the balls 52 in the outer and inner rings of circular bores 42. Each ball-engaging surface 56, 58 is a trapezoidal acceleration cam surface comprising alternating parabolic and intermediate fairing sections. All portions of each surface are perpendicular to the axes of rotor 38 and wave cams 54, 55, and radially-aligned portions of the two surfaces 56, 58 of each wave cam 54, 55 are of equal amplitude. The period of the cam is 36° (that is, each entire annular surface includes 10 substantially identical complete cycles each having one high point or peak and one low point or valley) and its total amplitude (peak-to-valley) is approximately ¼" (that is, slightly less than one-half the diameter of one of balls 52). A segment of wave cam 54 subtending an arc of approximately 36° (about one complete cam cycle) is illustrated in FIG. 2.

Wave cams 54, 55 also include, outwardly of ball-engaging surfaces 56 and 58, an annular rack 60. A displacement control shaft 62, journalled within a bearing 64, extends radially inwardly through housing center section 12 and includes at its inner end a geared pinion 66 engaging racks 60.

In practice, the motor is assembled with port plates 14, 15 rotated 18° (one-half the period of the cam surfaces of wave cams 54, 55) with respect to each other. Wave cam 54 is mounted within the recess in port plate 14 with the high points of its ball-engaging surfaces 56, 58 radially aligned with corresponding ends of the kidney-shaped ports 36 in port plate 14, which will in the subsequently described operation be a high pressure inlet port plate. Wave cam 55 is mounted within the recess in port plate 15 with the high-points of its ball-engaging surfaces axially-aligned with and facing the high-points of the ball-engaging surfaces of wave cam 54. In this configuration, the low points of the ball-engaging surfaces of wave came 55 will be radially-aligned with corresponding ends of the kidney-shaped ports 37 in port plate 15.

Fluid is introduced, at high pressure, into the motor through conduit 32 of manifold 16 and exits from the motor, at low pressure, through conduit 33 of manifold 17. A power stroke of the balls 52 within a pair of radially-aligned bores 42 commences when the balls engage a crest or high point of the ball-engaging surfaces 56, 58 of wave cams 54, 55 and, therefore, are in their nearest relative position. With the balls in this position, the rotor port 44 associated with the pair of radially-aligned bores communicates with the end of a kidney-shaped port 36 of port plate 14 that is aligned with the high point of wave cam 54. High pressure fluid from inlet conduit 32 passes from the inlet through annular groove 30, kidney-shaped port 36, rotor port 44 and rotor conduit 48 into the pair of bores 42, thereby forcing the balls within the bores away from each other against the ball-engaging surfaces 56, 58 of wave cams 54, 55. The force of the balls against the ball engaging surfaces imparts a torque to and causes rotation of rotor 38. As the rotor rotates, balls 52 roll down the slopes of the ball-engaging surfaces with which they are in contact, the balls within each of bores 42 thereby moving apart. When, after 18° rotation of rotor 38, the balls have reached their most distant relative position, rotor port 44 moves out of communication with kidney-shaped port 36 and into communication with a kidney-shaped port 37 in port plate 15. Port 37 is connected, through groove 30 in manifold 17 to low pressure fluid outlet conduit 33. During the next 18° rotation of rotor 34, balls 52 roll up the slopes of ball-engaging surfaces 56, 58, thereby moving together and discharging fluid from the bores 42 into the outlet.

As previously mentioned, the illustrated motor includes 63 pairs of radially-aligned bores, and the balls in each bore go through ten power stroke-fluid discharge cycles per complete revolution of rotor 38. The various pairs of radially-aligned bores are so arranged with respect to wave cams 54, 55 that at any point in the rotation of rotor 38, approximately half the bore pairs are in a power stroke (receiving high pressure fluid) and approximately half the bore pairs are discharging fluid to the low pressure outlet.

The horsepower of a fluid motor depends, among other variables, upon the motor's effective or working displacement. The effective displacement of the illustrated motor is 126 times the effective displacement of a single cylinder (each cylinder including one bore 42 together with the pair of balls 52 therein) and can be varied by turning control shaft 62 to rotate wave cams 54, 55 relative to each other.

Figure 3A:
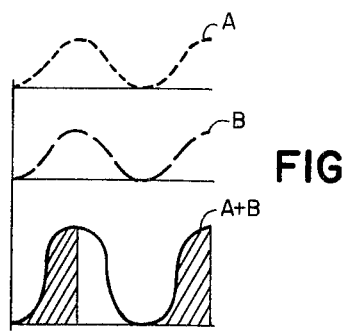
Figure 3B:
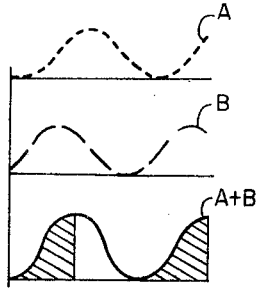
Figure 3C:
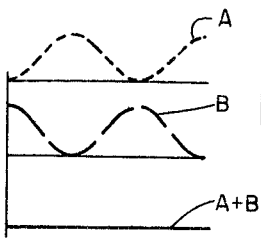
Figure 1:
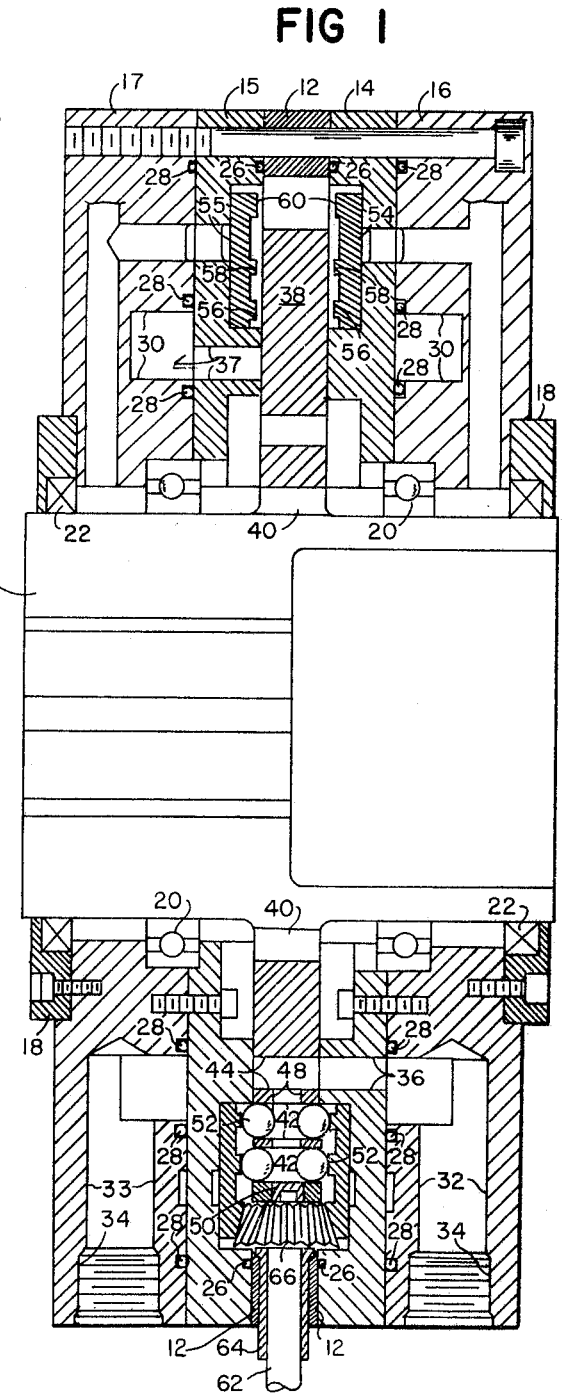
FIG. 1 is a sectional view of a rotary motor constructed in accordance with the invention.

FIGURES 3a, 3b, and 3c diagrammatically illustrate the displacement of a single cylinder during approximately 54° rotation (one and one-half cycles of wave cams 54, 55) of rotor 38 for three different relative positions of wave cams 54, 55. In each of FIGS. 3a-3c, the dotted line represents the displacement of one of the balls (A) within the cylinder; the dashed line represents the displacement of the other ball (B); and the solid line, the total displacement of the two balls $(A+B)$. Each ball (A, B) causes fluid to be displaced into the cylinder when it is moving axially outwardly (upwardly from its respective horizontal axis A, B in FIGS. 3a–3c) and discharges fluid when it is moving axially inwardly. Fluid is in fact drawn into the cylinder when the two balls $(A+B)$ are moving relatively apart and is discharged from the cylinder when they are moving together. When, as in the illustrated embodiment, fluid enters the cylinder under high pressure and is discharged into a sump, only positive displacement (fluid into cylinder) contributes to the motor's power. The positive displacement of the cylinder in each of FIGS. 3a–3c is as indicated by the shaded area under the solid line.

In FIG. 3a, wave cams 54, 55 are in the position previously described, with the high and low points of the ball-engaging surfaces of the two cams facing each other, and the displacement of each cylinder of the motor is at its maximum.

FIG. 3b illustrates the displacement obtained when the two cams are rotated 9° (one-quarter cam cycle) with respect to each other. In this position, the movement of the two balls are slightly out of phase (each moving outwardly during a portion of the time that the other is moving inwardly) and the displacement of the cylinder is somewhat less than in FIG. 3a.

In FIG. 3c, the two cams have been rotated 18° (one-half cam cycle) with respect to each other from the position of FIG. 3a. In this configuration, the low points of the ball-engaging surfaces of one cam are facing and aligned with the high points of the ball-engaging surfaces of the other cam, the balls are completely out of phase (as rotor 34 rotates, they move axially back and forth, as if in tandum), and the total displacement of the cylinder is zero.

It will be apparent to those skilled in the art that the fluid motor described herein functions also, with the utility and advantages apparent from what has been said, as a fluid pump when the rotor is made to drive, rather than being driven by, the fluid.

Other embodiments within the following claims will occur to those skilled in the art.

What is claimed is:
1. A fluid device comprising:
   a rotor including a plurality of cylindrical bores extending axially therethrough, a pair of axially-spaced porting surfaces perpendicular to the axis thereof, and fluid passages extending from said bores and terminating at said porting surfaces;
   a pair of ball pistons within each of said bores; and,
   a pair of identical port plates, each of said port plates including a porting surface engaging one of said porting surfaces of said rotor in face-to-face relationship and a plurality of fluid passages extending therethrough and terminating at the porting surface thereof.
2. A fluid device comprising:
   a rotor including a plurality of cylindrical bores extending therethrough and arranged in a plurality of sets, the bores of each set being circumferentially-spaced and at a predetermined distance from the axis of said rotor, and the bores of one of sets being at a greater distance from said axis than the bores of another of said sets,
   a porting surface perpendicular to the axis of said rotor, and
   fluid passages extending from said bores and terminating at said porting surface;
   a pair of ball pistons within each of said bores; and
   a port plate including a porting surface engaging the porting surface of said rotor in face-to-face relationship and a plurality of fluid passages extending therethrough and terminating at the porting surface thereof.

3. The device of claim 2 wherein said motor includes a pair of cams disposed on opposite axial sides of said rotor, each of said cams includes a plurality of concentric annular piston engagement surfaces, and each of said surfaces is associated with one of said sets of bores and engages one of the pistons within each bore of said one set.

4. The device of claim 3 wherein, for each of said cams, the portions of said surfaces in radial-alignment are of equal amplitude, and said surfaces are perpendicular to the axis of said rotor.

5. The fluid device of claim 2 wherein the bores of said one set are radially aligned with bores of said another set and a fluid passage is associated with each radially-aligned pair of said bores and includes a first portion extending axially through said rotor, a second portion providing fluid communication between said first portion and one of said pair of said bores, and a third portion providing fluid communication between the other of said pair of said bores and said first portion.

6. A fluid device comprising:
a rotor including a plurality of cylindrical bores extending axially therethrough, a pair of axially-spaced porting surfaces perpendicular to the axis thereof, and fluid passages extending from said bores and terminating at said porting surfaces;
a pair of ball pistons within each of said bores;
an inlet port plate; and,
an outlet port plate,
each of said port plates including a porting surface engaging one of said porting surfaces of said rotor in face-to-face relationship and a plurality of fluid passages extending therethrough and terminating at the porting surface thereof.

7. The device of claim 6 including an inlet manifold and an outlet manifold, each of said manifolds including an annular fluid passage and engaging one of said port plates.

8. The device of claim 7 wherein said manifolds are identical.

9. The device of claim 6 including a pair of identical cams disposed on opposite axial sides of said rotor, each of said cams engaging one of said port plates and including an annular piston engagement surface engaging one of said piston.

10. The device of claim 9 wherein each of said piston engagement surfaces is a cam surface having a plurality of identical cycles.

11. The device of claim 10 wherein each of said cam surfaces is a trapezoidal acceleration cam surface having an amplitude not more than of one-half the diameter of one of said ball pistons.

12. The device of claim 9 wherein the fluid passages in each of said port plates terminate at the porting surface of the respective port plate in an arcuate port, each of said arcuate ports subtending an arc of $180°/n$, where $n$ is the number of cycles of one of said cam surfaces.

13. The device of claim 12 wherein each of said rotor fluid passages includes a first portion extending axially through said rotor and a second portion extending radially from said first portion to said each bore.

14. The device of claim 13 wherein said bores are arranged in a plurality of sets, the bores of each of said sets are circumferentially spaced and at a predetermined distance from the axis of said rotor, the bores of one of said sets are radially-aligned with the bores of another of said sets, and each of said fluid passages includes a third portion extending radially from a bore of one of said sets to a bore of another of said sets.

15. The device of claim 14 wherein each of said cams includes a plurality of concentric annular piston engagement surfaces, each of said surfaces is associated with one of said sets of bores and engages a piston within each bore of said one set, each of said surfaces is perpendicular to the axis of said rotor and includes the same number of cam cycles, and radially-aligned portions of surfaces of each of said cams are of equal amplitude.

16. The fluid device of claim 6 including a pair of cams disposed on opposite axial sides of said rotor, each of said cams including an annular, trapezoidal acceleration piston engagement surfaces engaging one of said pistons.

References Cited

UNITED STATES PATENTS

| | | | |
|---|---|---|---|
| 2,617,360 | 11/1952 | Barker. | |
| 3,249,020 | 5/1966 | Albertson | 91—198 |
| 3,433,124 | 3/1969 | Parrett | 91—198 |

FOREIGN PATENTS

| | | |
|---|---|---|
| 10,908 | 1931 | Great Britain. |
| 362,721 | 10/1931 | Great Britain. |

PAUL E. MASLOUSKY, Primary Examiner

U.S. Cl. X.R.

91—176, 180